US008050690B2

(12) United States Patent
Neeraj (10) Patent No.: US 8,050,690 B2
(45) Date of Patent: Nov. 1, 2011

(54) LOCATION BASED PRESENCE AND PRIVACY MANAGEMENT

(75) Inventor: Chawla Neeraj, Bothell, WA (US)

(73) Assignee: mPanion, Inc., Bellevue, WA (US)

( * ) Notice: Subject to any disclaimer, the term of this patent is extended or adjusted under 35 U.S.C. 154(b) by 1045 days.

(21) Appl. No.: 11/838,876

(22) Filed: Aug. 14, 2007

(65) Prior Publication Data

US 2009/0047972 A1    Feb. 19, 2009

(51) Int. Cl.
*H04Q 7/20* (2006.01)
(52) U.S. Cl. .................... 455/456.1; 455/457
(58) Field of Classification Search ........... 455/456.1, 455/457, 404.1, 414.2; 340/426.19, 539.13
See application file for complete search history.

(56) References Cited

U.S. PATENT DOCUMENTS

| | | | |
|---|---|---|---|
| 6,055,513 A | 4/2000 | Katz et al. |
| 6,057,872 A | 5/2000 | Candelore |
| 6,101,484 A | 8/2000 | Halbert et al. |
| 6,157,841 A | 12/2000 | Bolduc et al. |
| 6,269,343 B1 | 7/2001 | Pallakoff |
| 6,295,528 B1 | 9/2001 | Marcus et al. |
| 6,381,303 B1 | 4/2002 | Vu et al. |
| 6,385,458 B1 | 5/2002 | Papadimitriou et al. |
| 6,400,956 B1 | 6/2002 | Richton |
| 6,442,391 B1 | 8/2002 | Johansson et al. |
| 6,442,530 B1 | 8/2002 | Miller |
| 6,446,004 B1 | 9/2002 | Cao et al. |
| 6,452,498 B2 | 9/2002 | Stewart |
| 6,505,123 B1 | 1/2003 | Root et al. |
| 6,556,975 B1 | 4/2003 | Wittsche |
| 6,587,835 B1 | 7/2003 | Treyz et al. |
| 6,611,751 B2 | 8/2003 | Warren |
| 6,631,404 B1 | 10/2003 | Philyaw |
| 6,647,257 B2 | 11/2003 | Owensby |
| 6,668,167 B2 | 12/2003 | McDowell et al. |
| 6,754,585 B2 | 6/2004 | Root et al. |
| 6,756,882 B2 | 6/2004 | Benes et al. |
| 6,756,917 B2 | 6/2004 | Gould et al. |
| 6,760,046 B2 | 7/2004 | I'Anson et al. |
| 6,760,601 B1 | 7/2004 | Suoknuuti et al. |
| 6,763,299 B2 | 7/2004 | Jones |
| 6,763,300 B2 | 7/2004 | Jones |

(Continued)

FOREIGN PATENT DOCUMENTS

JP       051869 A  *  3/2007

(Continued)

*Primary Examiner* — Cong Tran
(74) *Attorney, Agent, or Firm* — Michael A. Leonard, II; Sheetal S. Patel; Leonard Patel PC (57) ABSTRACT

A method and system for providing location based presence status and enhancing location privacy management in a mobile, instant messaging or social networking environment. A user specifies or saves their favorite locations (e.g. home, work, school, or particular business or point of interest locations), and specifies or selects names and/or categories to be shared for each user-specified location. In addition, the system provides multiple sharing levels for sharing multiple types of location contextual information. When user's current location corresponds to user-specified locations, location based presence status is provided to specified contacts according to the sharing level settings, and provides user the option to share location contextual information without sharing location coordinates of the user. When user is driving, location based presence status is updated accordingly, and when user is at other business or POI locations, corresponding location contextual information is shared based on user's settings for each sharing level.

23 Claims, 10 Drawing Sheets

U.S. PATENT DOCUMENTS

| | | |
|---|---|---|
| 6,764,003 B1 | 7/2004 | Martschitach et al. |
| 6,826,617 B1 | 11/2004 | Ansell et al. |
| 6,836,730 B2 | 12/2004 | Root et al. |
| 6,839,554 B2 | 1/2005 | McDowell et al. |
| 6,850,837 B2 * | 2/2005 | Paulauskas et al. ............ 701/200 |
| 6,868,396 B2 | 3/2005 | Smith et al. |
| 6,871,140 B1 | 3/2005 | Florance et al. |
| 6,873,997 B1 | 3/2005 | Majjasie et al. |
| 6,912,398 B1 | 6/2005 | Domnitz |
| 6,912,517 B2 | 6/2005 | Agnihotri et al. |
| 6,931,254 B1 | 8/2005 | Egner et al. |
| 6,937,998 B1 | 8/2005 | Swartz et al. |
| 6,944,467 B2 | 9/2005 | Ala-Luukko |
| 6,944,679 B2 | 9/2005 | Parupudi et al. |
| 6,947,976 B1 | 9/2005 | Devitt et al. |
| 6,954,633 B1 | 10/2005 | Metternich et al. |
| 6,954,697 B1 | 10/2005 | Smith |
| 6,957,393 B2 | 10/2005 | Fano et al. |
| 6,965,868 B1 | 11/2005 | Bednarek |
| 6,965,872 B1 | 11/2005 | Grdina |
| 6,973,322 B2 | 12/2005 | Buchmann et al. |
| 6,973,438 B1 | 12/2005 | Philyaw |
| 6,975,872 B2 | 12/2005 | Cheng |
| 6,983,146 B2 | 1/2006 | Spratt |
| 6,985,813 B2 | 1/2006 | Root et al. |
| 6,988,037 B2 | 1/2006 | Root et al. |
| 6,996,579 B2 | 2/2006 | Leung et al. |
| 7,116,985 B2 | 10/2006 | Wilson et al. |
| 7,206,568 B2 | 4/2007 | Sudit |
| 7,219,303 B2 | 5/2007 | Fish |
| 7,224,978 B2 | 5/2007 | Zellner et al. |
| 7,224,987 B1 | 5/2007 | Bhela et al. |
| 7,236,799 B2 | 6/2007 | Wilson et al. |
| 7,237,201 B2 | 6/2007 | Fish |
| 7,242,946 B2 | 7/2007 | Kokkonen et al. |
| 7,245,925 B2 | 7/2007 | Zellner |
| 7,266,443 B2 * | 9/2007 | Hirose ........................ 701/117 |
| 7,315,259 B2 | 1/2008 | Sacks |
| 7,412,400 B1 | 8/2008 | Bhela et al. |
| 7,417,544 B2 | 8/2008 | Artem et al. |
| 7,418,267 B2 | 8/2008 | Karaoguz |
| 7,418,451 B2 | 8/2008 | Leung et al. |
| 7,418,503 B2 | 8/2008 | Zellner et al. |
| 7,426,436 B1 | 9/2008 | Van Watermulen et al. |
| 2002/0002504 A1 | 1/2002 | Engel et al. |
| 2002/0035605 A1 | 3/2002 | McDowell et al. |
| 2002/0065111 A1 * | 5/2002 | Otsuka et al. ................ 455/566 |
| 2002/0067308 A1 | 6/2002 | Robertson |
| 2002/0077130 A1 | 6/2002 | Owensby |
| 2002/0091568 A1 | 7/2002 | Kraft et al. |
| 2002/0102993 A1 | 8/2002 | Hendrey et al. |
| 2002/0111172 A1 | 8/2002 | DeWolf et al. |
| 2003/0060214 A1 | 3/2003 | Hendrey et al. |
| 2003/0078053 A1 | 4/2003 | Abtin et al. |
| 2003/0093314 A1 | 5/2003 | Leung et al. |
| 2003/0207683 A1 | 11/2003 | Lempio et al. |
| 2003/0220835 A1 | 11/2003 | Barnes, Jr. |
| 2003/0229592 A1 | 12/2003 | Florance et al. |
| 2004/0023666 A1 | 2/2004 | Moon et al. |
| 2004/0111335 A1 | 6/2004 | Black et al. |
| 2004/0192351 A1 | 9/2004 | Duncan |
| 2004/0203561 A1 | 10/2004 | Jakubowski |
| 2004/0203879 A1 | 10/2004 | Gardner et al. |
| 2004/0203888 A1 | 10/2004 | Mikan |
| 2004/0203901 A1 | 10/2004 | Wilson et al. |
| 2004/0203922 A1 | 10/2004 | Hines et al. |
| 2005/0027437 A1 * | 2/2005 | Takenaga et al. ............. 701/117 |
| 2005/0027608 A1 | 2/2005 | Wiesmuller et al. |
| 2005/0096013 A1 | 5/2005 | Lehikoinen et al. |
| 2005/0096040 A1 | 5/2005 | Haberman et al. |
| 2005/0165788 A1 | 7/2005 | Yang et al. |
| 2005/0177416 A1 | 8/2005 | Linden |
| 2005/0202832 A1 | 9/2005 | Sudit |
| 2005/0227711 A1 | 10/2005 | Orwant et al. |
| 2005/0250517 A1 * | 11/2005 | Fukui et al. ................. 455/456.4 |
| 2005/0261001 A1 | 11/2005 | Marley et al. |
| 2005/0272413 A1 | 12/2005 | Bourne |
| 2006/0020508 A1 | 1/2006 | Gorti et al. |
| 2006/0022048 A1 | 2/2006 | Johnson |
| 2006/0046744 A1 | 3/2006 | Dublish et al. |
| 2006/0116817 A1 | 6/2006 | Salmre et al. |
| 2006/0135177 A1 | 6/2006 | Winterbottom et al. |
| 2007/0042788 A1 | 2/2007 | Duan |
| 2007/0042789 A1 | 2/2007 | Moton et al. |
| 2007/0047479 A1 | 3/2007 | Shaffer et al. |
| 2007/0049287 A1 | 3/2007 | Dunn |
| 2007/0049288 A1 | 3/2007 | Lamprecht et al. |
| 2007/0049289 A1 | 3/2007 | Woo |
| 2007/0049292 A1 | 3/2007 | Emond |
| 2007/0049293 A1 | 3/2007 | Russell |
| 2007/0060171 A1 | 3/2007 | Sudit et al. |
| 2007/0072619 A1 | 3/2007 | Wei et al. |
| 2007/0072621 A1 | 3/2007 | Mukkavilli et al. |
| 2007/0072625 A1 | 3/2007 | Fournier et al. |
| 2007/0072626 A1 | 3/2007 | Babu et al. |
| 2007/0077939 A1 | 4/2007 | Uematsu et al. |
| 2007/0077942 A1 | 4/2007 | Heaven et al. |
| 2007/0077943 A1 | 4/2007 | Hamilla |
| 2007/0080830 A1 | 4/2007 | Sacks |
| 2007/0082668 A1 | 4/2007 | Silver et al. |
| 2007/0082680 A1 | 4/2007 | Fish |
| 2007/0082681 A1 | 4/2007 | Kim et al. |
| 2007/0082682 A1 | 4/2007 | Kim et al. |
| 2007/0091838 A1 | 4/2007 | Kobayashi et al. |
| 2007/0093257 A1 | 4/2007 | McDougall et al. |
| 2007/0096900 A1 | 5/2007 | Contractor |
| 2007/0099625 A1 | 5/2007 | Rosenfeld |
| 2007/0099627 A1 | 5/2007 | Kofol et al. |
| 2007/0105565 A1 | 5/2007 | Enzmann et al. |
| 2007/0105566 A1 | 5/2007 | Sharony et al. |
| 2007/0117571 A1 | 5/2007 | Musial |
| 2007/0117572 A1 | 5/2007 | Adam et al. |
| 2007/0117573 A1 | 5/2007 | Kennedy et al. |
| 2007/0129082 A1 | 6/2007 | Thacher |
| 2007/0129083 A1 | 6/2007 | Creamer et al. |
| 2007/0135136 A1 | 6/2007 | Ische |
| 2007/0142059 A1 | 6/2007 | Wang et al. |
| 2007/0142060 A1 | 6/2007 | Moton et al. |
| 2007/0149208 A1 | 6/2007 | Syrbe et al. |
| 2007/0149210 A1 | 6/2007 | McKiou et al. |
| 2007/0149211 A1 | 6/2007 | Dunn et al. |
| 2007/0149212 A1 | 6/2007 | Gupta et al. |
| 2007/0149213 A1 | 6/2007 | Lamba et al. |
| 2007/0149214 A1 | 6/2007 | Walsh et al. |
| 2007/0149216 A1 | 6/2007 | Misikangas |
| 2007/0155399 A1 | 7/2007 | Alberth et al. |
| 2007/0155400 A1 | 7/2007 | Madsen |
| 2007/0159322 A1 | 7/2007 | Campbell et al. |
| 2007/0161381 A1 | 7/2007 | Chen et al. |
| 2007/0161382 A1 | 7/2007 | Melinger et al. |
| 2007/0161401 A1 | 7/2007 | Sheynblat |
| 2007/0167170 A1 | 7/2007 | Fitchett et al. |
| 2007/0167171 A1 | 7/2007 | Bishop |
| 2007/0168127 A1 | 7/2007 | Zaruba et al. |
| 2007/0168524 A1 | 7/2007 | Chao et al. |
| 2008/0172173 A1 | 7/2008 | Chang et al. |
| 2008/0266324 A1 | 10/2008 | Lynch et al. |
| 2008/0288545 A1 | 11/2008 | Hegedus et al. |
| 2008/0299900 A1 * | 12/2008 | Lesyna ........................ 455/26.1 |
| 2009/0006480 A1 | 1/2009 | Fuchs et al. |
| 2009/0042584 A1 * | 2/2009 | Nagata et al. ............... 455/456.1 |
| 2010/0017874 A1 | 1/2010 | Piccinini et al. |
| 2010/0020776 A1 | 1/2010 | Youssef et al. |

FOREIGN PATENT DOCUMENTS

| | | |
|---|---|---|
| KR | 10-2005-0004662 A | 1/2005 |
| KR | 10-2005-0014940 A | 2/2005 |
| KR | 10-2007-0053539 A | 5/2007 |

* cited by examiner

Fig 2a

| Sharing Level | Level Name | Location Information Shared |
|---|---|---|
| 0 | No Sharing | N/A |
| 1 | City, State | + City, State<br>Zip<br>Area Name |
| 2 | Favorite Locations | + Favorite Locations<br>    + User-Specified Locations<br>    + User-Specified POI Names<br>+ POI Categories<br>    POI Names |
| 3 | Location Coordinates | + Street Name<br>+ Nearest Intersection<br>+ POI Names<br>+ Street Address<br>+ Location Coordinates |

| Location Name Type | Shared at or above level: | Configuration Options |
|---|---|---|
| City_Name, State_Code | 1 | N/A |
| User-Specified Locations | 2 | N/A |
| User-Specified POI Names | 2 | 2-3 |
| POI Category | 2 | 2-3 |
| Street Name | 3 | 2-3 |
| Nearest Intersection | 3 | 2-3 |
| POI Names | 3 | 2-3 |

| Location Name | Street Address | Location Coordinates | Location Category | Mini. Level | Days / Dates | Time |
|---|---|---|---|---|---|---|
| Home | 123 home st. city, state 01234 | Lat / Lon | Home | 2 | All | 00:24 |
| Work | 123 business st. city, state 01234 | Lat / Lon | Work | 2 | All | 00:24 |
| [Loc Name] | [Address] | [Lat/Lon] | [Category] | [2-3] | Days [All, 1-7] or Dates[From:To] | [00:24] |

Fig 5b

| Location Name | Street Address | Location Coordinates | Geometry | Location Category | Loc. Name Level | Loc. Cat. Level |
|---|---|---|---|---|---|---|
| Pagliacci | 123 106th ave city, state 01234 | Lat / Lon | Point | Restaurant | 3 | 2 |
| Echo Falls | 123 echo st. city, state 01234 | Lat / Lon | Polygon | Golf Course | 2 | 2 |
| [Business or POI Name] | [Address] | [Lat/Lon] | [GeomType] | [Category] | [2-3] | [2-3] |

Fig 6

| Sharing Level | Proximity | Location Name | Status Indicator(s) |
|---|---|---|---|
| 1 | - | City, State | - |
| 2 | At / Near | User-Specified Locations / Business or POI Category | Driving / User-specified location categories / Business or POI categories |
| 3 | At / Near / Distance | User-Specified Locations / Business or POI Name / Street Name and/or Nearest Intersection | Driving / User-specified location categories / Business or POI categories |

Fig 9

LOCATION BASED PRESENCE AND PRIVACY MANAGEMENT

BACKGROUND

1. Field

The invention is a method and system for providing location based presence status and enhancing location privacy management in mobile, social networking and instant messaging environments.

2. Description of the Related Art

Location based services (LBS) have been on the wireless carrier product roadmaps for several years, however there has been limited mainstream adoption of such services, and much of the infrastructure and systems have been put in place to meet the emergency services (E-911) mandates.

With the advancements in Global Positioning System (GPS) technology for mobile devices, the accuracy of mobile positioning systems has improved significantly, and consumer LBS applications such as real-time navigation using mobile devices are now available on selected mobile devices offered by carriers. However, both carriers and consumers are concerned about consumer privacy and liability issues involved with offering and enabling such applications.

A significant percentage of mobile phones sold today are enabled with a GPS chip, which can determine the precise location of the user. While users are given the ability to turn off location tracking on their mobile devices for all location based applications with the exception of E-911 services, this results in the user not being able to take advantage of any location based services.

Location based presence, messaging and mobile social networking applications require users to share their location coordinates, however due to privacy concerns many users don't take advantage of such services. Some of the location based applications offer ability to share location coordinates by user or a group of users, and/or restrict sharing location information at the city or zip code level. However, in order to convey location information related to a subscriber's presence at a precise and specific location, such as the subscriber's home or work, or a business or point of interest, the subscriber has to share their location coordinates or address information with other users and/or applications.

Further, the process of updating presence status with other users in a mobile instant messaging environment imposes additional challenges compared to the desktop instant messaging environment. Particularly, due to the battery, memory, processing and screen size limitations of the mobile devices, current mobile instant messaging applications drain the battery of the mobile device in the process of sending real time updates of the presence information of the entire buddy list.

Also, several mobile location-based and social networking applications require a mapping interface to display the mobile user's location. Due to bandwidth constraints of the mobile network, and the memory, processing capability and battery limitations of the mobile device, delivering mapping information on mobile networks adds additional costs and complexity limiting the adoption of such applications.

SUMMARY

In most instances, what users really need is the ability to share location contextual information about their presence at specific locations (such as home, office, school, etc.) where they spend most of their time, and selectively sharing their location coordinates with other users when requested by the user or as the need arises. The invention provides users an option to share location contextual information related to user-specified locations by using generic or user-specified location names, graphical indicators and/or location category information, and further provide location based presence status to other users of instant messaging applications without sharing their location coordinates or address information.

In other instances, when users are at a business or a point of interest such as a restaurant, library, golf course, etc., the invention enables the mobile user to indicate their presence status based on the category of that location, (e.g., restaurant, golf course, library, etc.) and optionally based on the business or POI name without sharing location coordinates with other users.

In other instances when the user is driving, the invention enables the mobile user to indicate their presence status as driving to convey they are not at their regular locations such as home or work, and provide location contextual information based on geographical area or proximity to user-specified locations without sharing their location coordinates and without offering location tracking capability to other users.

Such location contextual information and location based presence status, in most instances, enables the calling or messaging party to become aware of the user's availability status, and can be broadly shared with all contacts, while significantly mitigating concerns about privacy and liability related to tracking user's location coordinates.

Another embodiment of the invention is to group users and/or location privacy options into multiple, numerically or descriptively labeled, location privacy or location sharing levels, wherein one of the levels is based on sharing location contextual status at precise locations using generic or user-specified location names, location status indicators, or location category information, without sharing location coordinates or address information of the user.

Another aspect of the invention is to enable an efficient and optimal method of updating location based presence status with a large number of contacts in a mobile and instant messaging environment. Other features of the invention will be apparent from the description, the drawings and the claims.

BRIEF DESCRIPTION OF THE DRAWINGS

Foregoing aspects of the invention will become better understood by referring to the following description taken in conjunction with the accompanying drawings.

DETAILED DESCRIPTION

Figure 1:
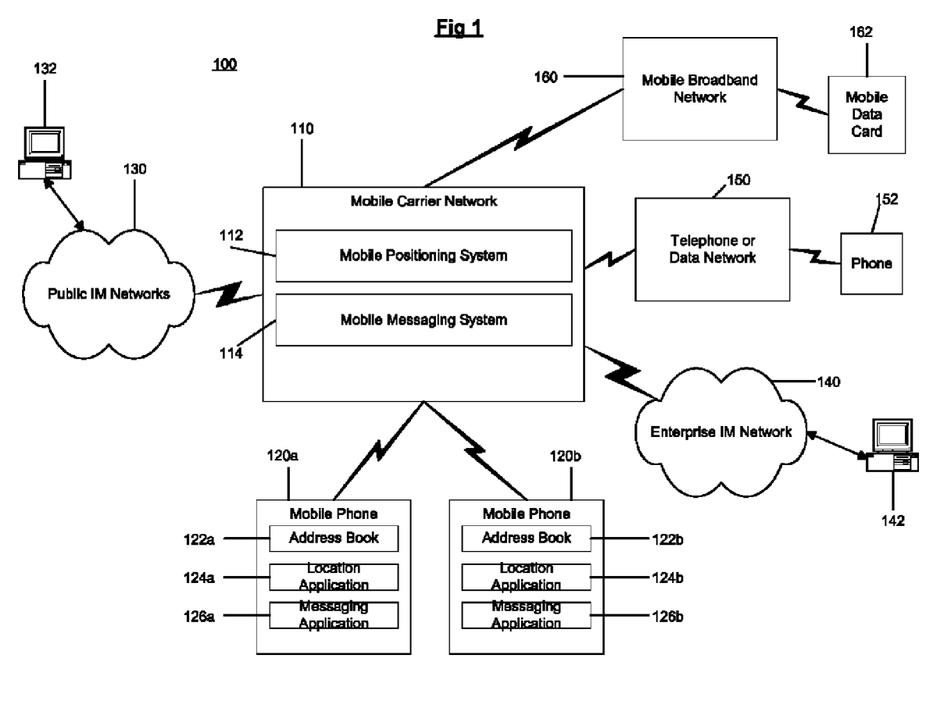
FIG. 1 is a block diagram of an exemplary communication system providing a suitable operating environment for the present invention.

FIG. 1 and the following description provide a general description of a communication system 100 suitable for implementing various features of the invention. With reference to FIG. 1, an exemplary communication system for implementing the invention includes a mobile carrier network 110 which offers voice, messaging and/or data services to mobile phones 120a and 120b, and is capable of communicating with instant messaging (IM) networks, such as, a public IM network 130 and public IM client 132, or an enterprise IM network 140 and enterprise IM client 142. The mobile carrier network 110 is also capable of communicating with other telephone or data networks 150 such as a Public Switched Telephone Network (PSTN) or a Voice over Internet Protocol (VOIP) network capable of delivering voice and/or data services to communication devices such as a phone 152. The communication system may also comprise of a fixed mobile or a broadband mobile network 160, such as, for example, a WiMax network capable of delivering voice and data services through communication devices such as a mobile data card 162.

In particular, the communication system 100 is capable of detecting or receiving geographic location information of a user's mobile phone or other associated terminal or device. In one implementation, the mobile carrier network 110 includes a mobile positioning system 112 that is capable of determining location coordinates of the mobile phones 120a and 120b. The mobile positioning system 112 may receive the location coordinates from the Global Positioning System (GPS) receiver embedded in the mobile phone 120a or 120b, and in another implementation assist the mobile phone 120a or 120b in determining its location using one or more of the mobile positioning methods including Assisted (A-GPS), Time Difference of Arrival (TDOA), or other approaches that provide location coordinates within specified constraints of accuracy. In one implementation, the mobile positioning system 112 includes a location server which may be a Gateway Mobile Location Center (GMLC) in case of GSM networks or a Mobile Positioning Center (MPC) in case of CDMA networks, which provides the user's location information to third party location application servers implementing location based services and applications.

The mobile carrier network 110 also includes a mobile messaging system 114 that is capable of transmitting text or data messages from and to the mobile phones 120a or 120b, which may include image, audio or video messages, and may use one or more of the mobile data messaging services and protocols including Short Messaging Service (SMS), Multimedia Messaging Service (MMS), Wireless Application Protocol (WAP) or other Internet Protocol (IP) based data and application-layer protocols used in third generation (3G) mobile standards, such as, for example, Session Initiation Protocol (SIP). The mobile carrier network 110 may include any of the underlying RF transport protocols, such as, for example, General Packet Radio Service (GPRS), Enhanced Data rates for GSM Evolution (EDGE), Wideband Code Division Multiple Access (WCDMA), CDMA 20001x-RTT, CDMA 1x-EV-DO, or any of the 3G or 4G mobile standards.

The mobile phones 120a and 120b are exemplary mobile devices used by two different mobile subscribers, which may be on the same mobile carrier network, or may be part of different mobile carrier networks. The mobile phones 120a or 120b include an address book 122a or 122b, a location client application 124a or 124b, one or more mobile messaging applications 126a or 126b which may include a text messaging application, a multimedia messaging application, an email application, and/or an instant messaging application.

The public IM network 130 comprises of instant messaging (IM) services such as those offered by MSN, AOL, Yahoo, or Google, and may be based on proprietary implementations or based on industry standards such as Session Initiation Protocol (SIP) or Extensible Messaging and Presence Protocol (XMPP). The public IM client 132 may be a desktop or mobile IM client subscribing to a public IM network 130.

The enterprise IM network 140 comprises of instant messaging services provided by companies and large enterprises to their corporate users for a controlled and managed access to instant messaging services. The enterprise IM clients 142 may be a desktop or mobile IM client subscribing to an enterprise IM network 140.

Figure 2A:
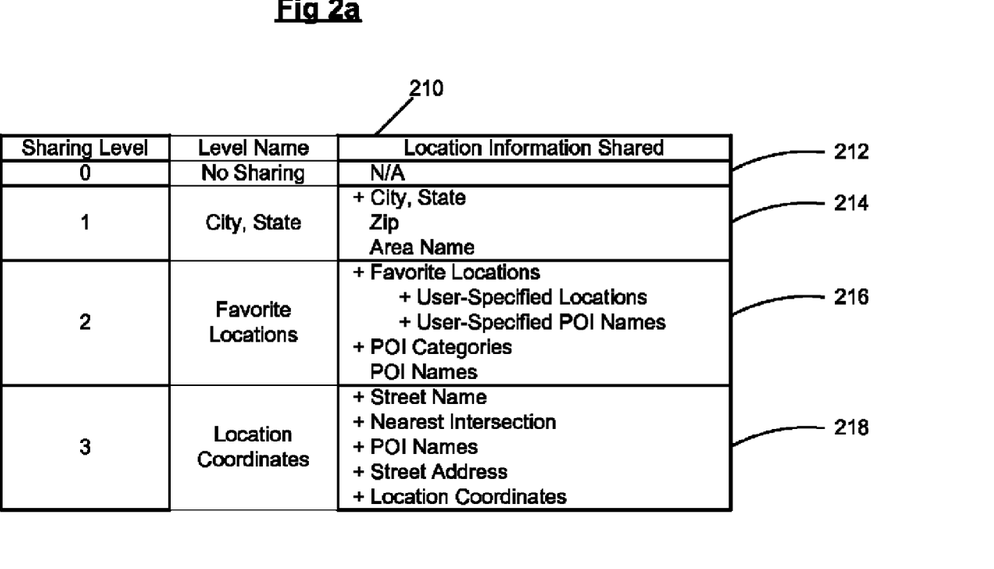
FIG. 2a is an exemplary classification of location contextual information into multiple, numerically and descriptively labeled, location sharing levels.

FIG. 2a illustrates an exemplary implementation of grouping various types of location contextual information into multiple, numeric and descriptively labeled location sharing levels. Further, one of the sharing levels enables sharing location contextual names of user-specified locations without sharing location coordinates of the user. In one implementation, the invention enables a mobile user to select location sharing options and select or specify descriptive names for location sharing levels 0 to 3 as described in table 210. As shown in table 210, the location contextual information options at a particular sharing level are in addition to the options available at the previous sharing level. As shown in field 212, at level 0, no location information is shared. As shown in field 214, at level 1, only city and state level information is shared by default, with options to select zip or area level names. As shown in field 216, at level 2, location contextual information corresponding to precise user-specified geographic locations is shared when user is at or near these locations, without providing street address or location coordinates of the user. Location contextual information may include names, categories and representative graphical indicators of user-specified locations and user-specified business or POI locations, and optionally categories of other non-specified business or POI locations, such as, for example, home, office, work, school, restaurant, golf course, library, etc. The user may also specify the option to include business or POI names when user is at non-specified business or POI locations. As shown in field 218, at level 3, all relevant location information may be shared with selected users at this level including street name, nearest intersection, business and POI names and/or categories as specified by the user. Location coordinates and street address are also shared if an authorized user at this level requests location coordinates or other location information that requires sharing such information such as, for example, directions to mobile subscriber's current location.

Figure 2B:
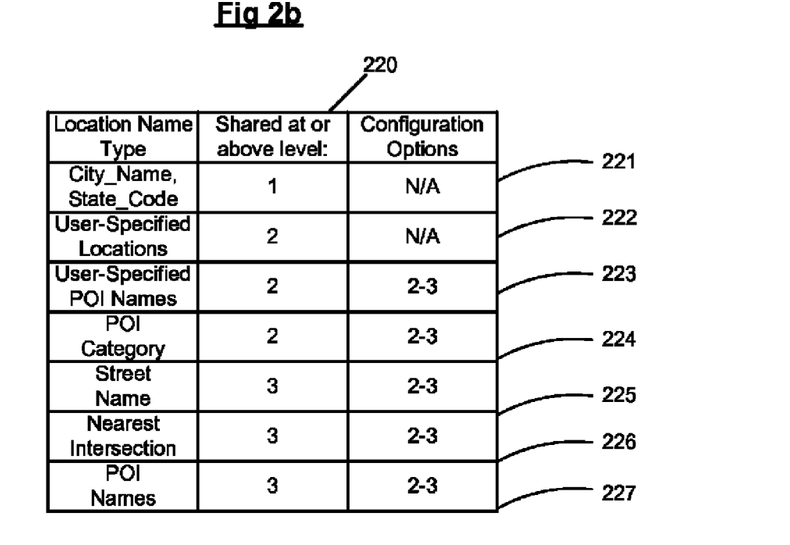
FIG. 2b is an exemplary table for associating location contextual name types with corresponding sharing levels.

FIG. 2b is an exemplary table for associating location contextual name types and corresponding sharing levels. As represented in table 220, the default settings for location name types and corresponding sharing levels are specified, along with the configuration options for sharing levels that maybe specified by the user. As represented in field 221, location names based on city and state are available for sharing with users at sharing level 1 or higher. As represented by field 222, when user is at or near user-specified locations, location contextual information based on location names and categories of these locations are available for sharing with users at sharing level 2 or higher, without providing location coordinates or street address information of the mobile subscriber's current location. As represented in field 223, user-specified POI names, which also include user-specified business names, will be available for sharing at level 2 or above. As shown in the configuration options, user may change the minimum sharing level for this location name type to level 3. As shown in field 224, the business or POI category information will be available for sharing with users at level 2 or above, when the mobile subscriber is determined to be at a business or POI location. The mobile subscriber may change the minimum sharing level for this location name type to level 3. Further, as shown in fields 225 and 226, location contextual information may also include street name and nearest intersection of their current location when sharing with users at level 3. The mobile subscriber may change the sharing level for this location name type to sharing level 2 or higher. As represented in field 227, business or POI names corresponding to user's current location, when user is determined to be at a location that is a business or POI will also be available for sharing with users at sharing level 3. The mobile subscriber may change the sharing level for this location name type to sharing level 2 or higher.

Figure 3:
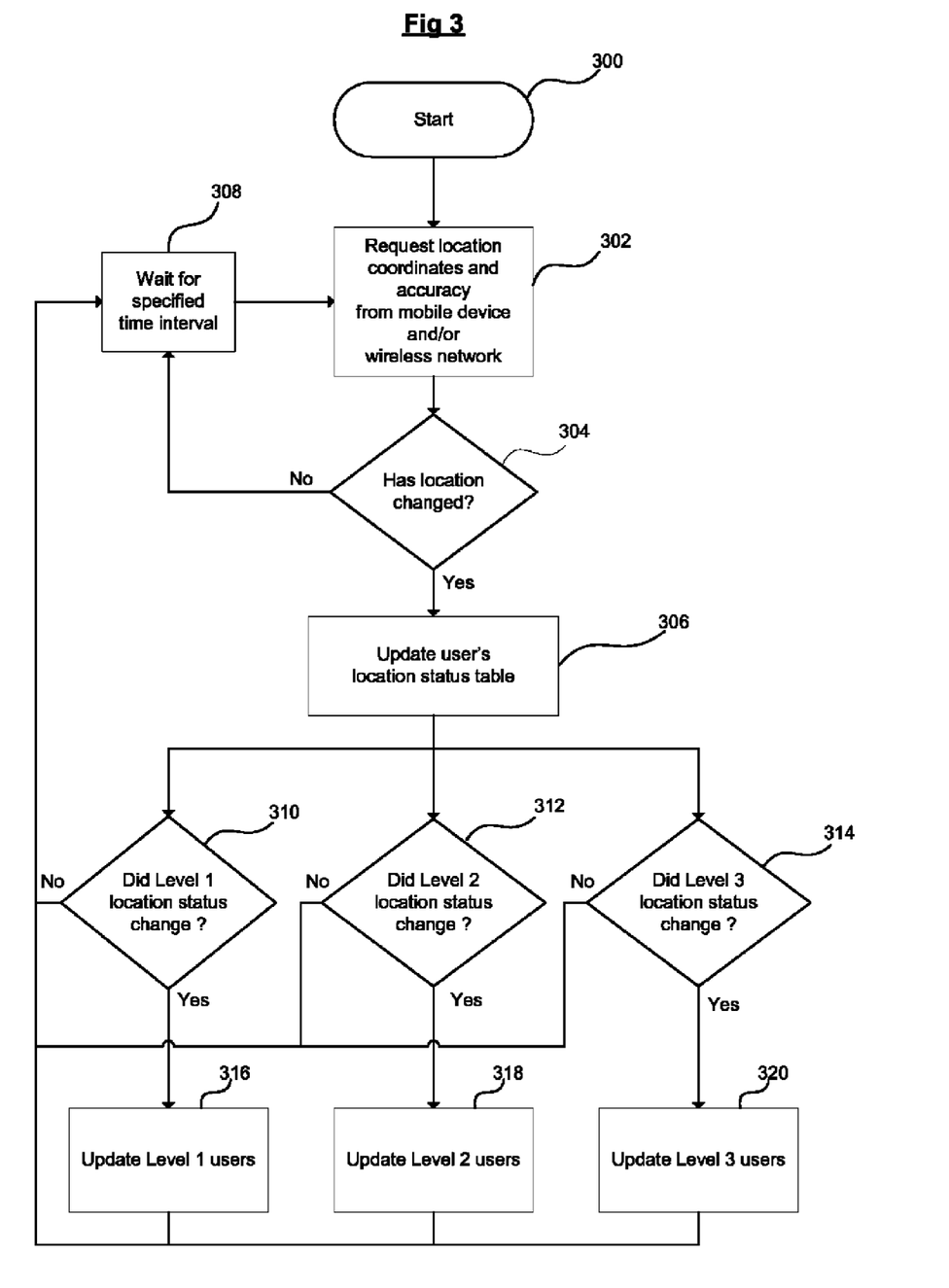
FIG. 3 is an exemplary flowchart for updating users at multiple location sharing levels with the location based presence status corresponding to that level as the user's location changes.

FIG. 3 illustrates an exemplary flow diagram 300 for updating users at multiple location sharing levels with location based presence or status information corresponding to that level, as the mobile subscriber's location changes. Beginning at block 302, the location application server responsible for storing and sharing location contextual information of mobile phones 124*a* or 124*b* requests location coordinates and accuracy information from mobile positioning system 112. The mobile positioning system 112 may provide the most recent location information of the mobile device from its database or cache, or may request current location information from the corresponding mobile phone 120*a* or 120*b*. At the decision block 304, a test is made to determine if the current location of mobile device has changed from its previous location above a minimum threshold to account for the accuracy constraints of the location information. If the location has not changed, at block 308, the location application 124*a* or 124*b* is instructed to wait for a specified time interval and then repeat the process of requesting updated location coordinates in block 302. In another implementation, the functions of blocks 302, 304, and 308 may be performed by a trigger or notification step in the mobile positioning system, which would notify the designated location application server when the location of mobile device changes, and provide the updated location coordinates of the mobile subscriber. In yet another implementation, the functions of blocks 302, 304, and 308 may be performed by another location application server within the mobile carrier network working in conjunction with the mobile positioning system. At block 306, the location application 124*a* or 124*b* or the designated location application server determines and updates the location based presence status corresponding to each sharing level, described in detail in FIG. 4. After the location status table is updated based on the current location, tests are made in the decision blocks 310, 312 and 314 to determine if the location status corresponding to level 1, 2 and 3 changed as a result of the new location of the mobile subscriber. In blocks 316, 318, 320, corresponding level 1, 2 or 3 users are updated if the location status for their corresponding sharing levels has changed. In one scenario, only level 2 and/or level 3 status may change, while level 1 status may remain the same as before, e.g., if the mobile subscriber has moved to a new location which is in the same city, level 1 status would remain the same. The application server, in this case, will only update location status with level 2 and level 3 users, thus minimizing the frequency of updates for level 1 users, and providing an efficient way for updating only a subset of users that are authorized to receive more specific location status.

Additionally, mobile subscribers may select level 1 or level 2 as their default location sharing level for sharing with all users who request location status or are in the contacts list. In one implementation, any user can request and receive the mobile subscriber's location status corresponding to the default location sharing level, and the location application server only updates location status with a subset of users corresponding to the higher sharing levels, thus providing an efficient and optimal way for sharing location based presence status with a large number of users. In another implementation, location status corresponding to the default sharing level 1 or 2 is shared with the public IM network with an option to request location status corresponding to higher sharing levels, which may then be provided automatically if the contact is an authorized user at the higher sharing level, or the request may be sent for approval to the mobile subscriber.

Figure 4:
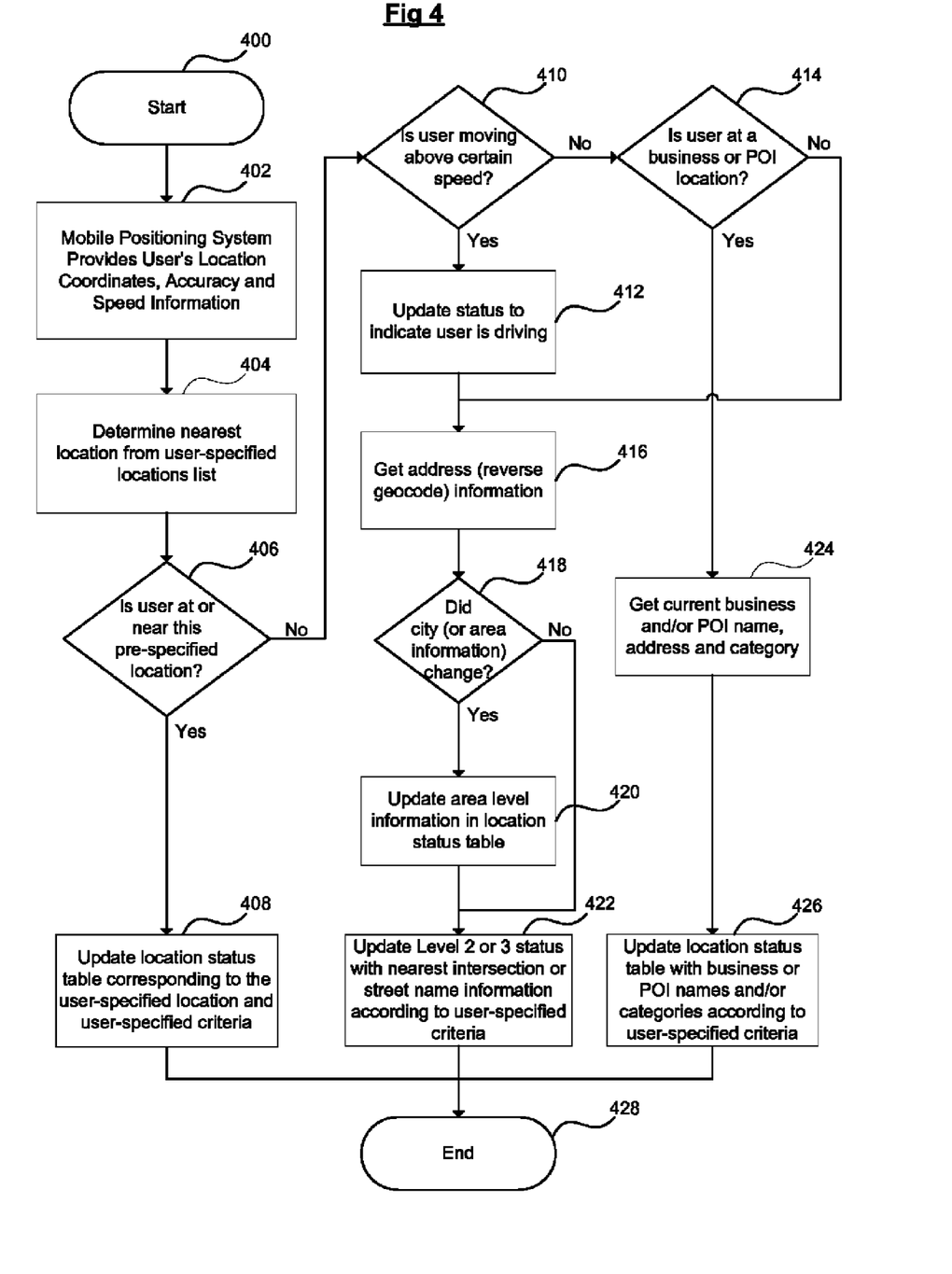
FIG. 4 illustrates an exemplary flowchart to update a user's location status table based on whether user is at or near user-specified locations, driving, or at business or POI locations.

FIG. 4 illustrates an exemplary flowchart to update a mobile subscriber's location status table based on whether the user is at or near user-specified locations, driving, or at a business or POI location. As described earlier, when the test in decision block 304 determines that the location of mobile subscriber has changed, the subroutine 400 starts, and as shown in block 402, the mobile phone's location coordinates, accuracy and speed information are provided by the mobile positioning system 112. At block 404, the location coordinates of the mobile subscriber are compared with the location coordinates of the user-specified locations stored in the tables shown in FIGS. 5*a* and 5*b*, and the nearest location and corresponding distance from user's current location is determined. At decision block 406, if user's current location is determined to be at or near this user-specified location within a specified distance, it is further specified if the user is at this location or near this location (e.g., at home, near home, at work, near work). Accordingly, in block 408, the location status table is updated based on the user-specified location and user criteria for status at level 1, 2 and 3. And if, in decision block 406, the user is determined to be not at or near any of the user-specified locations, then another test is made in decision block 410 to determine if the user is moving at or above a certain specified speed (e.g. moving at or above a speed of 10 miles per hour) whereby the status of the user is considered as driving, otherwise the user is considered to be stationary or moving at a slower speed but not at or near any user-specified location. If the user is determined to be driving, then as shown in block 412, the location status table in updated accordingly. And if the user is determined to be stationary within reasonable constraints of accuracy, then another decision test is made at block 414 to determine if the user is at a business or a POI location. If the user is determined to be at a business or POI location, then as shown in block 424, business name, category, and address information is requested from a geo-database and/or a business or POI database, and accordingly in block 426, the location status is updated with the corresponding information and user-specified criteria for each sharing level. If user is determined to be moving at a slower speed than specified for being considered as driving, or if there are multiple co-located businesses at the current location, user maybe prompted to confirm or select the current business location, and for these scenarios, the functions of blocks 414, 424 and 426 are replaced by subroutine 1000, and shown in detail in FIG. 10. If the user is considered to be driving or if in block 414, the user was determined to be stationary but not at a business or POI location, then the location status is determined corresponding to geographical area level information or based on the sharing level 1 status of the user. Accordingly, in block 416, the address information of the user is requested using the reverse geocode feature of the mobile positioning system or using another geo-database. At decision block 418, if the city (or area level information, as specified by the user) has changed, then the level 1 status is updated accordingly. If the city or area level information has not changed, then as shown in block 422, then only level 2 and/or level 3 status information is updated in the location status table of the mobile subscriber. Further, the level 2 textual status in this case may be same as level 1 status, as no additional location name and/or status information may be available for level 2.

Figure 5A:
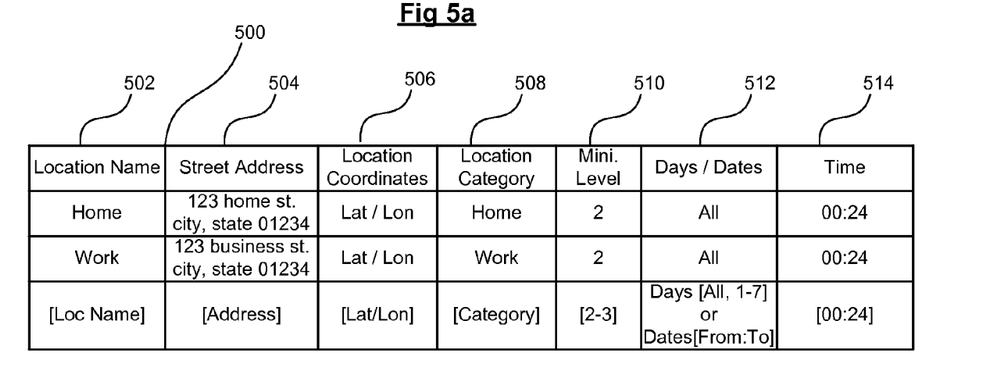
FIG. 5a is an exemplary table for storing user-specified locations and corresponding criteria for sharing location contextual information when user is at this location.

As shown in FIG. 5a, table 500 is an exemplary list of user-specified locations and corresponding settings saved in the pre-specified user's locations table that are available for determining the location status as described in steps 404, 406 and 408. In this example, two of the most common user locations, "Home" and "Work", are saved, where a user is likely to spend most of their time. In field 502, a generic location name such as "Work" may be specified by the user, or a more contextual location name may be specified (e.g., HQ, Main Campus, Factory, Building 34, etc.). In field 504, the address of the location is saved, which maybe provided by the user, or determined by the system based on location coordinates provided or saved by the user. In field 506, location coordinates are either specified by the user, or determined based on the address information provided in 504, or saved while user selects the options to save current location while at that particular location. In field 508, user selects an appropriate location category from the available list, or specifies a new category, which may be used to indicate the location status of the user. In field 510, user selects the default setting for minimum sharing level, or specifies from the range of options, based on which the location status will be shared with users in the corresponding sharing levels when the user is at that particular location. In fields 512 and 514, the user may select default settings or specify options for days, dates, and/or time settings when the location status should be shared with other users.

Figure 5B:
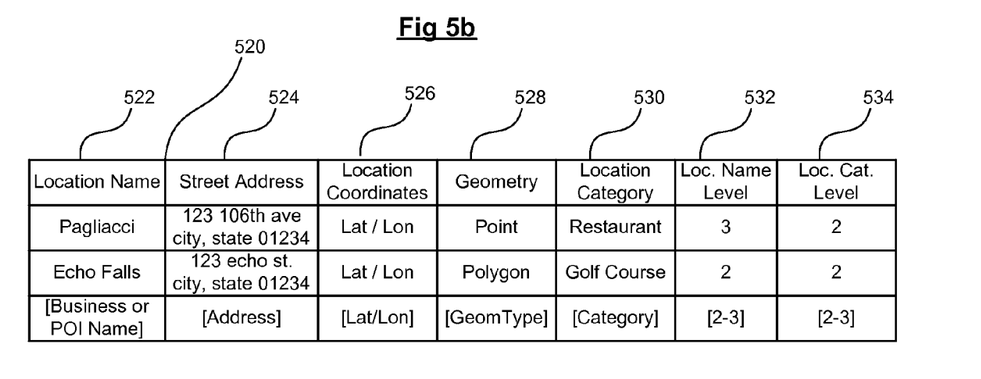
FIG. 5b is an exemplary table for storing user's favorite business and POI locations and corresponding criteria for sharing location contextual information.

As shown in FIG. 5b, table 520 is an exemplary table for storing user-specified business and POI locations, where the user wants to share location contextual status based on names, categories and/or address information of these locations. The user may save these locations and corresponding information while visiting these locations and building this list over time, or add locations at any time by specifying the required information, or by searching for specific business or POI locations by name or address using the options provided in the location application. In field 522, the name of the business or POI that may be used for location status is saved by either looking up from a business or POI database, or by having the user specify or customize the name. In field 524, the address of the location is saved, which maybe provided by the user, or determined by the system based on information available from the business or POI database, or by looking up address corresponding to the location coordinates. In field 526, location coordinates of the business or POI are either specified by the user, or determined based on the address information provided in 524, or saved while user selects the options to save current location while at that particular location. In field 528, geometry information of the POI is saved to indicate whether the POI is a point or covers an area of a specified geometry, in which case, additional information may be stored or requested from the geo database to determine location status at that location. In field 530, the appropriate location category is saved based on information received from the business or POI database, or as specified by the user. In field 532, user selects the default setting for minimum sharing level for location name of the business or POI, or specifies from the range of options, based on which the location status will be shared with users in the corresponding sharing levels when the user is at that particular location. In field 534, user selects the default setting for minimum sharing level for location category of the business or POI, or specifies from the range of options, based on which the location status will be shared with users in the corresponding sharing levels when the user is at that particular location.

Figure 6:
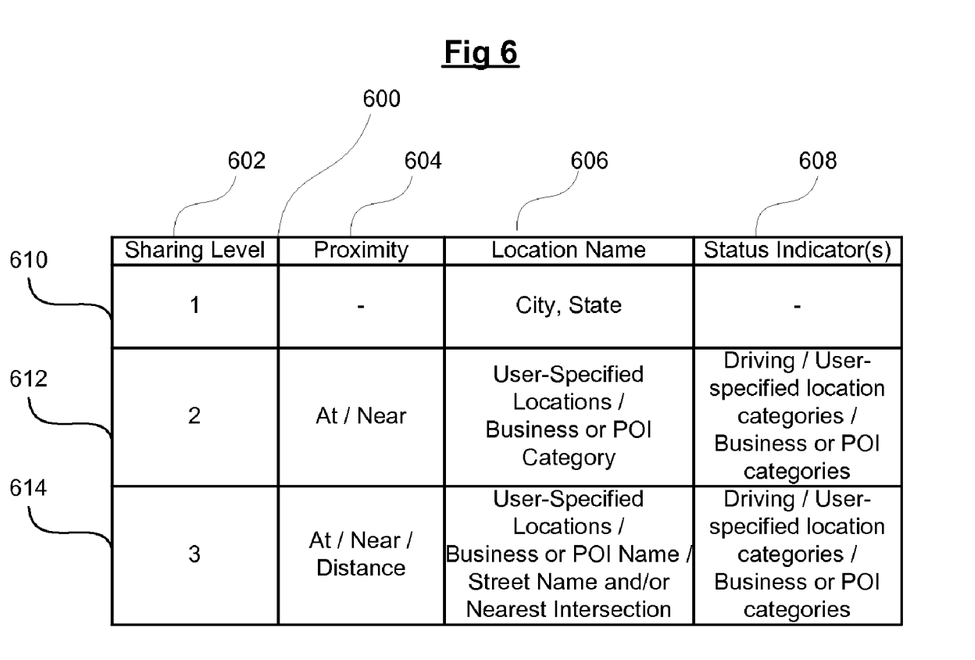
FIG. 6 is an exemplary table for storing a user's location based presence status corresponding to each location sharing level.

As shown in FIG. 6, table 600 is an exemplary table and illustration for determining and storing a user's location based presence status corresponding to each sharing level. Field 602 indicates the sharing level, which in current implementation ranges from 0 to 3 as described in table 210. A user may add a new sharing level, but for the purpose of this exemplary implementation, we assume levels 0 to 3, whereby at level 0, no location status is shared, and hence only levels 1 to 3 have a corresponding location status. As described earlier, at level 1, location name is based on city and state information, and as the location status of mobile subscriber is determined, in blocks 408, 420 or 426, the corresponding city and state information is updated in the field 606 corresponding to the record 610. Additionally, the last known status for this level may be saved along with a timestamp in a similar table to determine in the decision block 310 if the current status has changed from the previous status. Further, as the location status of mobile subscriber is determined, in blocks 408, 422, and 426, the corresponding level 2 and level 3 records 612 and 614 are updated accordingly. If the user is at or near a user-specified location corresponding to table 500 or 520, the corresponding status in field 604 will indicate "at" or "near" or another descriptor indicating proximity to the specified location. Additionally, for level 3 status in 614, approximate distance or time to location may be saved to indicate user is "within x miles" or "within y minutes" of the respective location. In another instance, if the status of the mobile subscriber in block 410 was determined to be driving, corresponding status indicator option in field 608 of records 612 and 614 will be saved.

Figure 7:
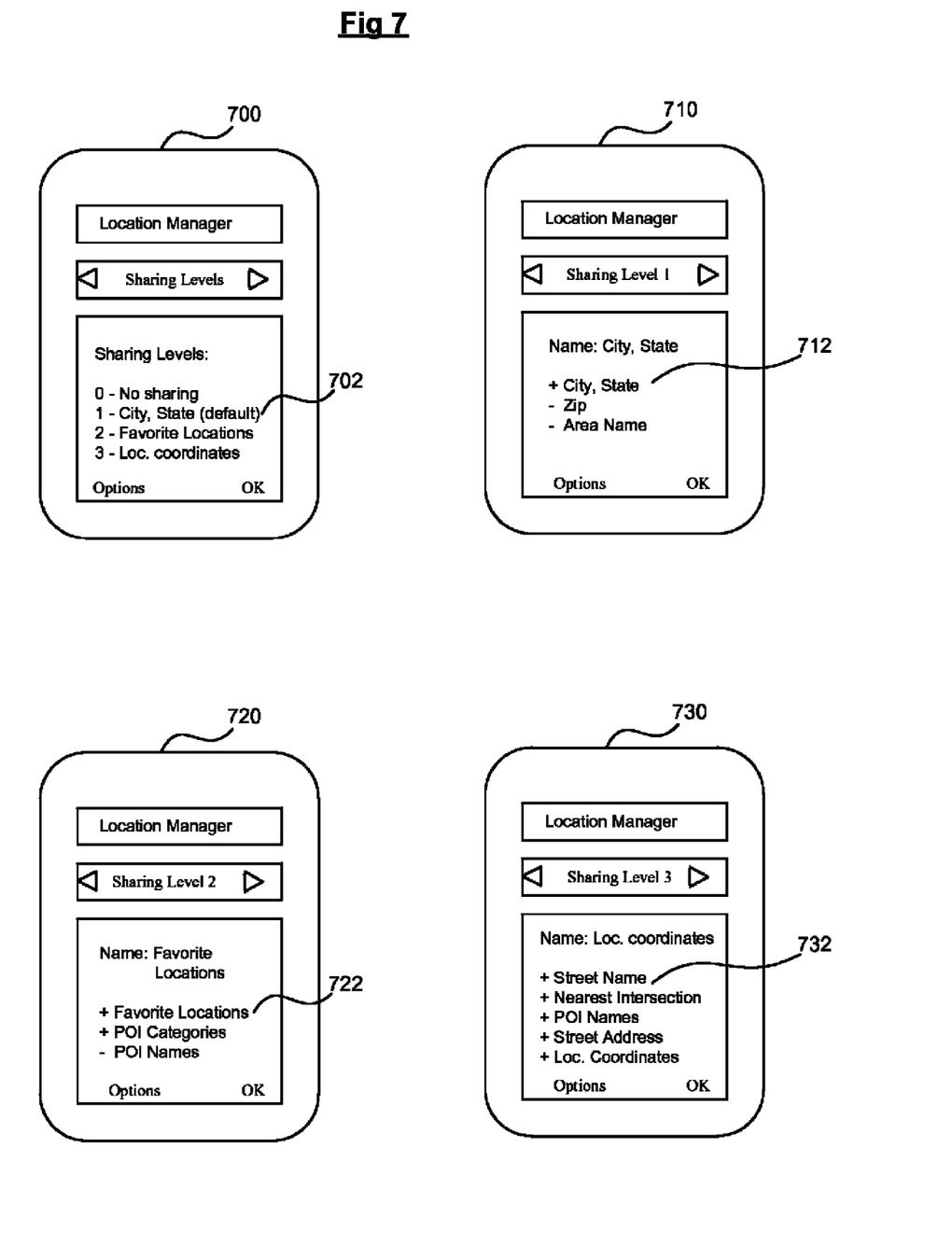
FIG. 7 is an exemplary user interface for specifying location contextual information corresponding to multiple location sharing levels.

FIG. 7 is an exemplary user interface of the mobile device 120a or 120b for indicating the sharing level options of the location application 124a or 124b. The sharing level interface 700 includes an option to select the default sharing level as indicated by setting 702. The user can also select any of the sharing levels and change settings for that sharing level. The sharing level interface screen 710 describes the settings for sharing level 1 and includes the default name for this level "City, State" and provides an option button which provides an option to specify or change the name of the sharing level. The settings 712 indicate options available for location name types at this level, and are based on area level name types and provide options to select one or more area level name type for this level. The "+" indicates that the option is currently selected, and "−" indicates that the option is not selected, but is available for selection at this sharing level. The sharing level interface screen 720 describes the settings for sharing level 2 and includes the default name for this level "Favorite Locations" and provides options to change the name and other settings for this sharing level. The settings 722 indicate the selected and available options for location name types at this level, which include the options for selecting favorite locations, POI categories and POI names. Favorite locations include the user-specified locations in table 500 and user-specified business or POI locations in table 520. The POI categories setting include all the categories corresponding to other POI locations not included in table 520. The POI names setting includes the names corresponding to other POI locations not included in table 520, which is not selected by default at sharing level 2, but the user may specify this option at this sharing level. The sharing level interface screen 730 describes the settings for sharing level 3 and includes the default name for this level "Location Coordinates" and provides an option to specify or change the name of the sharing level. The settings 732 indicate options available for location information at this level, and are based on proximity based information such as nearest intersection, street name, and POI names, in addition location information available at sharing level 2, and also includes the options to share street address and location coordinates at this level.

Figure 8:
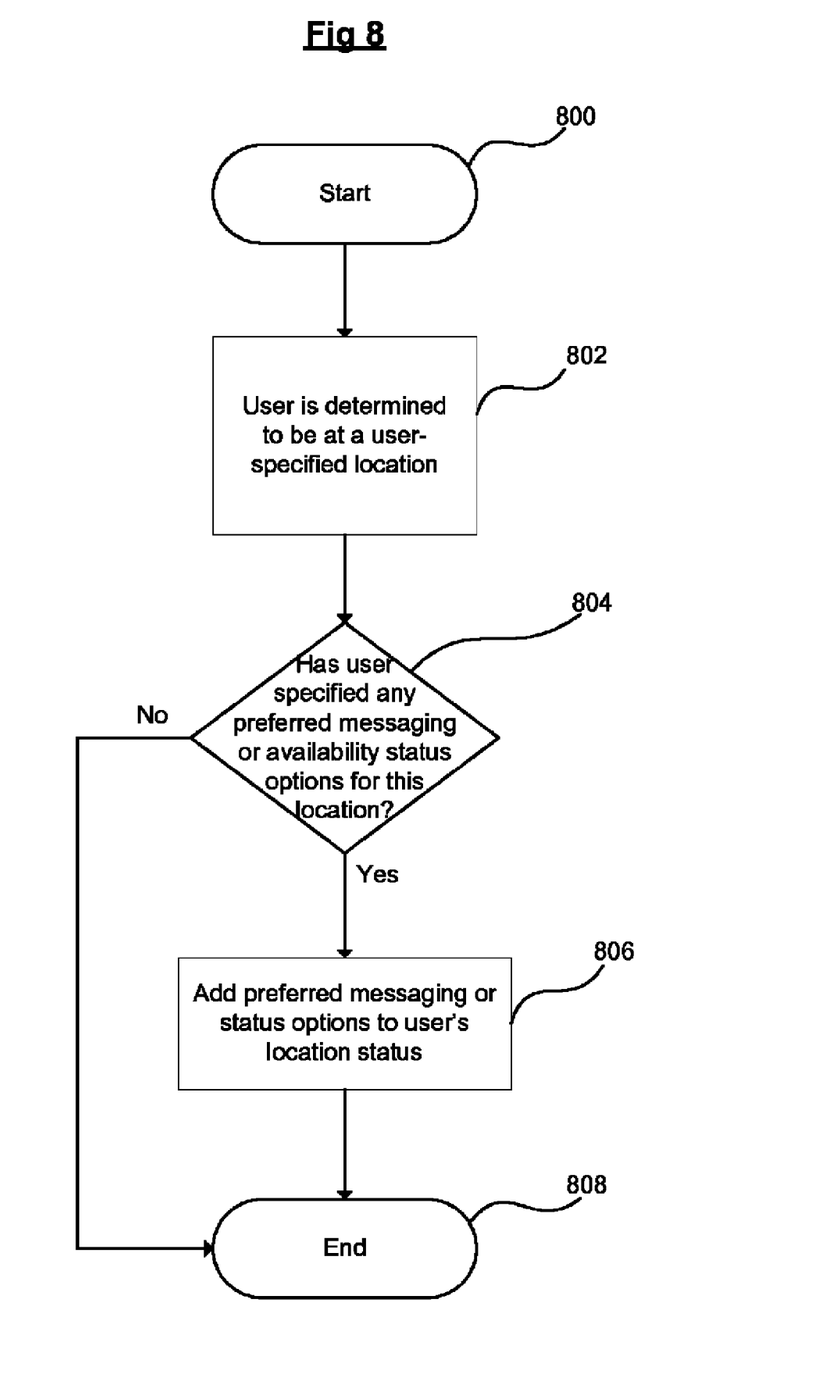
FIG. 8 is an exemplary flowchart for determining user's preferred messaging options corresponding to user-specified locations.

FIG. 8 is an exemplary flowchart for determining user's preferred messaging options corresponding to user-specified locations. As described earlier in decision block 406, when user is determined to be at any of the user-specified locations, the block 408 also includes the subroutine 800 in the process of determining the location status at this location. As shown in block 802, user is determined to be at a user-specified location. In the decision test of block 804, it is determined whether the user has specified any preferred messaging options corresponding to that user-specified location. For example, user may specify the home phone as preferred calling option while user's location status is "at home", or work phone as preferred calling option while user's location status is "at work". In other instances, the user may specify email, SMS or IM as preferred messaging options. If such a preferred messaging or calling option is specified, in block 806, it is added to the location status table 600.

Figure 9:
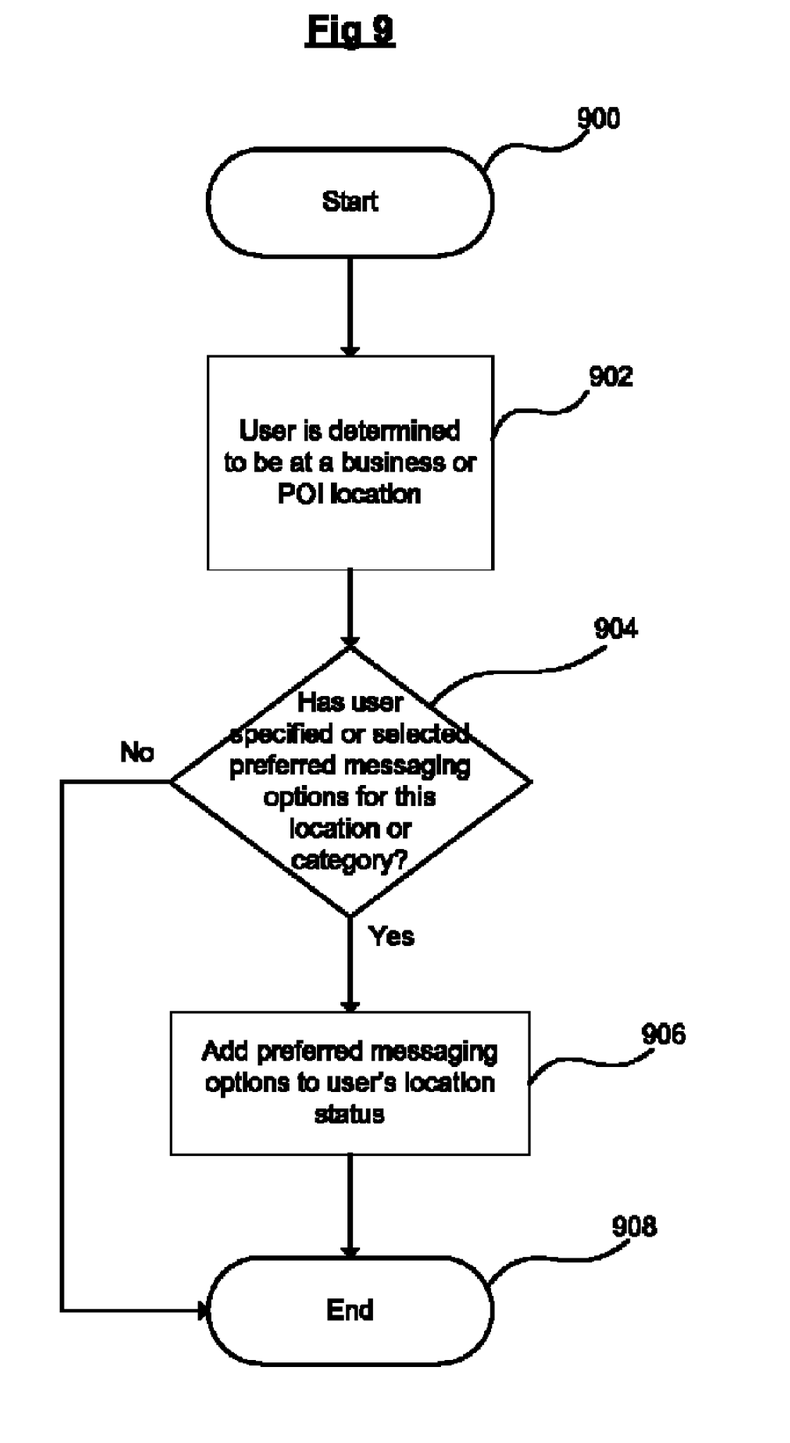
FIG. 9 is an exemplary flowchart for determining user's preferred messaging options corresponding to specific location categories.

FIG. 9 is an exemplary flowchart for determining user's preferred messaging options corresponding to specific location categories. When user is determined to be at a business or POI location, the block 428 includes the subroutine 900 in the process of determining and updating the location status at this location. As shown in block 902, user is determined to be at a business or POI location. In the decision test of block 904, it is determined whether the user has specified any preferred messaging options corresponding to that business or POI location or any default options exists for the location category. For example, for the POI category library, the user may specify email, SMS or IM as preferred messaging options. If such a preferred messaging option is specified, in block 906, it is added to the location status in table 600 discussed earlier.

Figure 10:
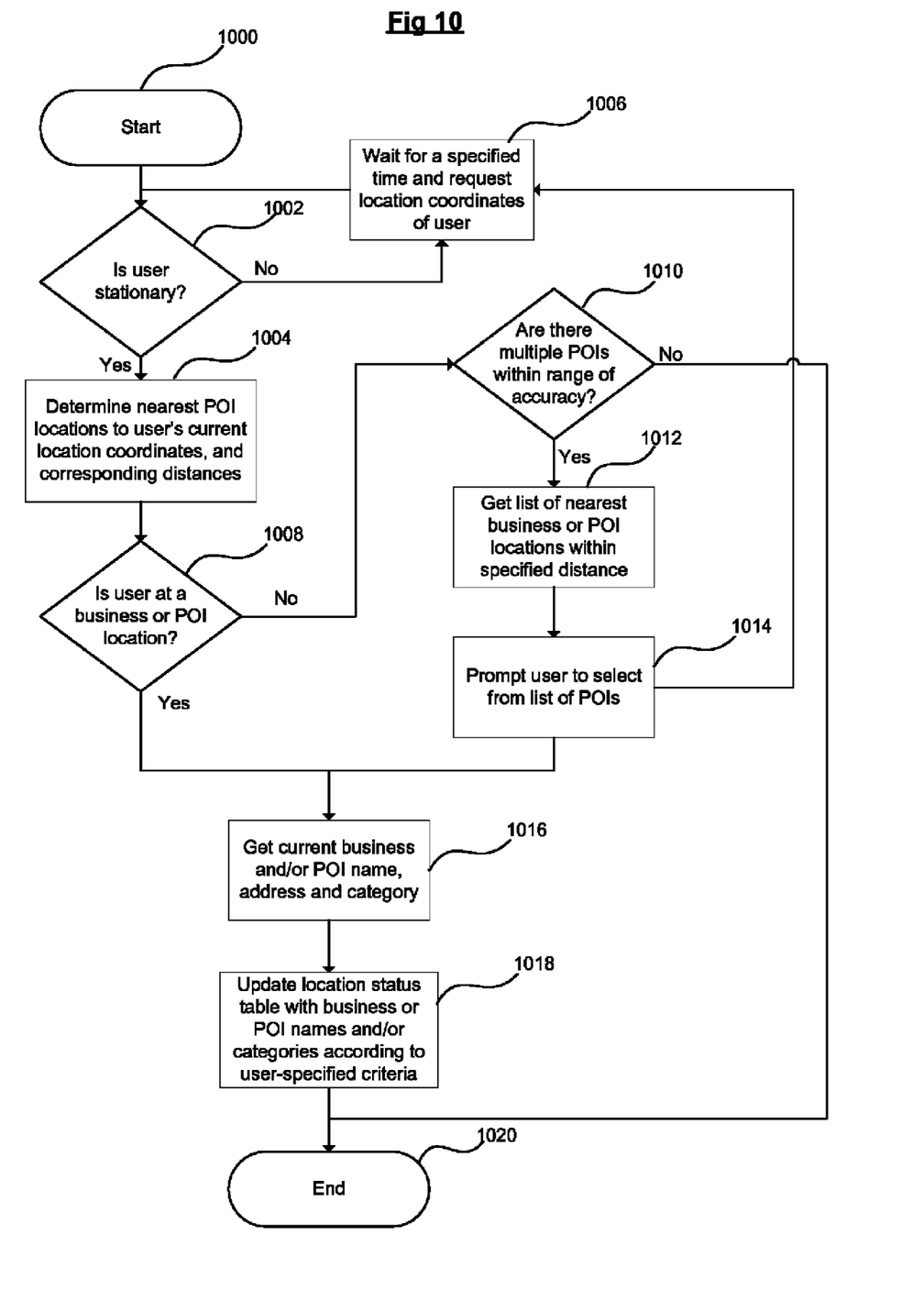
FIG. 10 is an exemplary flowchart for determining location status if there are multiple or co-located business or POI options at or near user's current location.

FIG. 10 is an exemplary flowchart for determining location status when there are multiple or co-located business or POI options at or near user's current location. As described earlier, in the test block 410, when the user is not at a user-specified location and not moving above a specified speed to be considered as driving, a test is made to determine if user is at a business or POI location. However, in several instances, multiple co-located business or POI locations may correspond to the user's current location within the constraints of accuracy of the mobile positioning system 112. Also, the user may be moving at a slower speed, and not stationary. In order to address these scenarios and determine the corresponding business or POI location, the functions of blocks 414, 424 and 426 may be replaced by subroutine 1000. In the decision block 1002, it is first determined if the user is stationary within the constraints of accuracy of the mobile positioning system 112. If the user is not considered stationary, then at block 1006, the location application 124a or 124b is instructed to wait for a specified time interval and then request updated location coordinates and repeat the process in block 1002. If the user is considered to be stationary, at block 1004, the nearest POI locations and corresponding distances are determined. At the decision block 1008, a test is made to determine if the user's current location corresponds to one and only one business or POI location, and if yes, then in block 1016, the business or POI name, category, and address information of that location are provided as the current location. If not, then at block 1010, it is determined if the user's current location may correspond to multiple POI locations, as determined within the accuracy constraints and specified distance criteria. If there are multiple co-located or nearby POI locations in the vicinity of user's location, at block 1012, a list of nearest locations within specified distance of user is provided to the user's location application 124a or 124b, and at block 1014, the user is prompted to select the current location from the list presented, and based on user's input, the information pertaining to that location is provided to block 1016. However, if there is no response from the user within a specified time, at block 1006, the location application 124a or 124b is instructed to wait for a specified time interval and request updated location coordinates and then repeat the process in block 1002.

It is also noted that while the above describes the exemplifying embodiments of the invention, those skilled in the art would appreciate several variations and modifications may be made without departing from the spirit and scope of the invention as described in the following claims.

What is claimed is:

1. A computer based method for sharing a user's location contextual information, comprising:
   a) a mobile phone or another electronic device capable of determining or accessing said user's current location from a mobile positioning system;
   b) said current location comprising of geographic location coordinates of said user's geographic location at that time, as determined within accuracy limitations of said device or said mobile positioning system;
   c) said geographic location coordinates comprising of latitude and longitude or alternatively postal street address of said geographic location;
   d) storing the geographic location coordinates of any user-specified locations specified or saved by said user;
   e) said location contextual information comprising of a plurality of descriptive name, category, and other textual or graphical representation of a geographic location;
   f) associating said location contextual information with said current or user-specified locations;
   g) one or more contacts or applications that said location contextual information corresponding to said user's current location is to be shared with or provided to;
   h) determining if said contacts or applications are authorized to receive said location contextual information based on criteria specified by said user;
   i) providing said location contextual information to said contacts or applications without providing said geographic location coordinates of said current location;
   whereby the method enables said user to share said location contextual information indicating location status of said user without having to provide said geographic location coordinates of said user.

2. The method of claim 1, further providing the option to said contact to request said geographic location coordinates of said user, and providing or denying such request based on privacy settings of said user with respect to said contact, and optionally including a manual approval step as specified by said user, whereby the method enables sharing said location contextual information with said contacts while providing additional options to manage and control sharing of said geographic location coordinates on a case by case basis.

3. The method of claim 1, further providing the option to said contact to request distance, proximity or navigation information to said current location, which may be provided or denied based on privacy or sharing level settings of said user with respect to said contact, and optionally including a manual approval step as specified by said user, whereby the method enables sharing said location contextual information with said contacts while providing additional options to request, manage and control additional information that requires sharing said geographic location coordinates on a case by case basis.

4. The method of claim 1, additionally comprising of a process for accessing either or both of the name and category of a business or point of interest corresponding to a particular geographic location and associating said location contextual information based on said name or said category of said business or point of interest location according to criteria specified by said user.

5. The method of claim 1, wherein said location contextual information includes additional information specifying said user's preferred messaging or calling options at said current location.

6. The method of claim 1, wherein said location contextual information includes additional information specifying said user's preferred messaging or calling options based on the category of said location.

7. The method of claim 1, wherein said applications include instant messaging, email, text messaging, social networking or other location based applications.

8. The method of claim 1, wherein displaying said location contextual information on said contact's mobile device, instant messaging or another application involves one or more steps, wherein either or both of the graphical representation and a part of the said location contextual information may be displayed by the said application with an option to view or request additional location contextual information, whereby said location contextual information may be partially displayed due to screen size or other user interface limitations of said application and providing an option for said contact to view or request additional location contextual information.

9. The method of claim 1, wherein the process of associating said location contextual information includes:
   a) determining the nearest user-specified location and associating the corresponding location contextual information if said user is at or within a specified distance of said nearest user-specified location;
   b) determining if said user is at a business or point of interest location, and if yes, associating the location contextual information corresponding to said business or point of interest location.

10. The method of claim 1, wherein the process of associating said location contextual information comprises:
   a) determining if multiple business or POI locations correspond to said current location;
   b) determining the list of nearest business or POI locations within a specified distance of said current location;
   c) providing an option for said user to select or specify the relevant location from said list;
   d) associating said location contextual information corresponding to selected location;
   whereby the method enables said user to select or specify relevant location if co-located or multiple business or POI locations correspond to said current location.

11. The method of claim 1, wherein the process of providing said location contextual information to said contacts comprises determining if said location contextual information corresponding to said contacts or groups of contacts has changed and updating only the contacts or groups of contacts for whom said location contextual information has changed.

12. The method of claim 1, wherein providing location contextual information at said user-specified locations is further filtered based on temporal options including one or more of day, date or time based options.

13. A computer based method for enabling multiple levels of sharing location contextual information, comprising:
   a) a mobile phone or another electronic device capable of determining or accessing a user's geographic location coordinates from a mobile positioning system;
   b) said geographic location coordinates comprising of latitude and longitude or alternatively postal street address of said geographic location;
   c) said location contextual information comprising of a plurality of descriptive name, category, and other textual or graphical representation of a geographic location;
   d) specifying multiple, numerically or descriptively labeled, location sharing levels with varying levels of location privacy;
   e) specifying multiple types of location contextual information corresponding to a geographic location coordinate including a plurality of city, state, zip, neighborhood or area name, names and categories of user-specified locations, businesses or points of interest, and proximity information including nearest intersection, street name, street address, and location coordinates;
   f) associating said types of location contextual information with said sharing levels wherein each type of location contextual information can be assigned specific sharing levels or a minimum sharing level;
   g) assigning specific sharing levels to selected contacts or groups of contacts, and assigning a default sharing level for all other contacts;
   h) providing said types of location contextual information to said contacts based on the sharing levels assigned to said contacts.

14. The method of claim 13, wherein one of the sharing levels comprises of location contextual information corresponding to names and categories of said user's current geographic location without including said geographic location coordinates of said user, whereby said user can share said location contextual information indicating location status of said user at said current geographic location without providing said geographic location coordinates of said user.

15. The method of claim 13, wherein providing said location contextual information is further filtered based on temporal options including one or more of day, date or time based options.

16. The method of claim 13, wherein providing said location contextual information is further filtered by assigning a specific or minimum sharing level to a user-specified geographic location.

17. The method of claim 13, wherein providing said location contextual information is further filtered by assigning a specific or minimum sharing level to a business or POI location name or category.

18. The method of claim 13, wherein providing said location contextual information to said contacts comprises:
   a) determining current location status of said user corresponding to said sharing levels based on said user's current location and said types of location contextual information corresponding to said sharing levels at said current location;
   b) determining if said current location status corresponding to said location sharing levels has changed compared to the last time it was determined;
   c) providing said location status only when it has changed, and only to said contacts associated with the sharing levels at which said location status has changed.

19. A computer based method for sharing a user's location status from a mobile phone, comprising:
   determining the user's current speed from a mobile positioning system;
   if the user's current speed is above a threshold, setting the user's location status to indicate that the user is in motion;
   providing the user's location status to one or more contacts associated with the user, wherein the location status does not include geographic location coordinates identifying the user's location.

20. The method of claim 19, wherein the user's location status indicates that the user is driving.

21. The method of claim 19, wherein the user's location status is provided as an audio-visual indicator to the user's contacts.

22. A computer based method for setting and sharing a mobile user's location-based presence status from a mobile phone, comprising:
   determining the mobile user's current location from a mobile positioning system associated with the mobile phone;
   associating location-based presence status options with identified locations, wherein the identified locations comprise point of interest locations and user-specified locations;
   setting the mobile user's location-based presence status to a corresponding option when the mobile user's determined current location matches (414) an identified location; and
   providing the mobile user's location-based presence status to one or more other users without providing geographic location coordinates of the mobile user.

23. The method of claim 22, including providing options to the mobile user for customizing the location-based presence status options that are associated with each point of interest and user-specified location.

* * * * *